United States Patent
Opalka et al.

(10) Patent No.: US 10,968,756 B2
(45) Date of Patent: Apr. 6, 2021

(54) THERMAL BARRIER COATING COMPOSITIONS, METHODS OF MANUFACTURE THEREOF AND ARTICLES COMPRISING THE SAME

(71) Applicant: United Technologies Corporation, Farmington, CT (US)

(72) Inventors: Susanne M. Opalka, Glastonbury, CT (US); Weina Li, South Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 275 days.

(21) Appl. No.: 15/449,673

(22) Filed: Mar. 3, 2017

(65) Prior Publication Data

US 2018/0252111 A1 Sep. 6, 2018

(51) Int. Cl.
*F01D 5/28* (2006.01)
*C23C 28/00* (2006.01)
(Continued)

(52) U.S. Cl.
CPC .............. *F01D 5/288* (2013.01); *B05D 1/005* (2013.01); *B05D 1/04* (2013.01); *B05D 1/36* (2013.01);
(Continued)

(58) Field of Classification Search
CPC ...................................................... F01D 5/288
(Continued)

(56) References Cited

U.S. PATENT DOCUMENTS 5,660,885 A 8/1997 Hasz et al.
2005/0053735 A1 3/2005 Beer et al.

FOREIGN PATENT DOCUMENTS

EP 1428902 A1 6/2004
EP 1793011 A2 6/2007
(Continued)

OTHER PUBLICATIONS

Mao, Impermeable thin Al2O36 overlay for TBC protection from sulfate and vanadate attack in gas turbines, Quarterly Progress Report, Department of Mechanical Engineering, p. 1-11 (Year: 2003).*
(Continued)

*Primary Examiner* — Tabatha L Penny
(74) *Attorney, Agent, or Firm* — Cantor Colburn LLP (57) ABSTRACT

A process for coating a gas turbine engine component is disclosed herein. The process comprises applying a bond coat on a substrate of a gas turbine engine. A thermal barrier material is applied to the bond coat. A coating containing polynuclear aluminum oxide/hydroxide clusters is then applied to the thermal barrier material. The polynuclear aluminum oxide/hydroxide clusters are $Al_{13}$ Keggin clusters having the formula $[AlO_4Al_{12}(OH)_{24}(H_2O)_{12}]^{7+}$, or are salts of the $Al_{13}$ Keggin clusters called $Al_{13}$ Keggin complexes. A gas turbine engine component comprising a superalloy substrate; a bond coat disposed on the substrate; a thermal barrier material on the bond coat; and a coating containing the polynuclear aluminum oxide/hydroxide clusters on the thermal barrier material is disclosed herein.

13 Claims, 4 Drawing Sheets

(51) Int. Cl.

| | | |
|---|---|---|
| *C23C 4/10* | (2016.01) | |
| *C23C 4/02* | (2006.01) | |
| *C23C 4/11* | (2016.01) | |
| *C23C 4/18* | (2006.01) | |
| *B05D 1/00* | (2006.01) | |
| *B05D 1/04* | (2006.01) | |
| *B05D 1/36* | (2006.01) | |
| *C01F 7/02* | (2006.01) | |
| *C09D 1/00* | (2006.01) | |
| *C09D 5/18* | (2006.01) | |
| *C09D 201/00* | (2006.01) | |
| *F01D 9/04* | (2006.01) | |
| *F01D 11/08* | (2006.01) | |
| *F01D 25/00* | (2006.01) | |
| *F02C 7/24* | (2006.01) | |
| *B05B 7/22* | (2006.01) | |
| *B05B 7/20* | (2006.01) | |
| *B05B 5/00* | (2006.01) | |

(52) U.S. Cl.
CPC ............. *C01F 7/02* (2013.01); *C09D 1/00* (2013.01); *C09D 5/18* (2013.01); *C09D 201/00* (2013.01); *C23C 4/02* (2013.01); *C23C 4/10* (2013.01); *C23C 4/11* (2016.01); *C23C 4/18* (2013.01); *C23C 28/3215* (2013.01); *C23C 28/345* (2013.01); *C23C 28/347* (2013.01); *C23C 28/3455* (2013.01); *F01D 9/041* (2013.01); *F01D 11/08* (2013.01); *F01D 25/005* (2013.01); *F02C 7/24* (2013.01); *B05B 5/00* (2013.01); *B05B 7/20* (2013.01); *B05B 7/22* (2013.01); *F05D 2220/32* (2013.01); *F05D 2230/90* (2013.01); *F05D 2260/231* (2013.01); *F05D 2300/611* (2013.01)

(58) Field of Classification Search
USPC ...................................................... 427/419.1
See application file for complete search history.

(56) References Cited

FOREIGN PATENT DOCUMENTS

| EP | 2233450 A1 | 9/2010 |
|---|---|---|
| WO | 2011159675 A1 | 12/2011 |

OTHER PUBLICATIONS

Dressler, Sol-Gel Preparation and Characterization of Corundum Based Ceramic Oxidation Protection Coatings, Dissertation, Aug. 30, 1977, p. 1-143 (Year: 1977).*
Kumar, Effect of Peptization on Densification and Phase-Transformation Behavior of Sol-Gel-Derived Nanostructured Titania, Journal of American Ceramic Society, 77 [5], (1994), p. 1396-1400 (Year: 1994).*
Roy, Solgel-Processed Mullite Coating—A Review, Int. J. Appl. Ceram. Technol., 12, p. E71-E77, 2015 (Year: 2015).*
European Extended Search Report for EP Application No. 18159402.9; dated Apr. 24, 2018 (18 pages).
Fournier et al.; "A Multi-technique study of the effect of aqueous aluminum speciation on hydrolytic gelation of aluminum (oxy) hydroxide"; Journal of Colloid and Interface Science; 332; 2009, pp. 122-129.

* cited by examiner

Flow Diagram
Coating Formula

Coating formulation with polynuclear metal oxide precursors

$Al_{13}$ complex

Silicate co-coagulant

1 nm

Precursor coating application and drying

Coating heat treatment and transformation

Unprotected airfoil blade thermal barrier coating surface

TBC / Bondcoat / Ni-based superalloy

Mixed Al/Si oxide/hydroxide

Alumina/aluminosilicate sealing layer

THERMAL BARRIER COATING COMPOSITIONS, METHODS OF MANUFACTURE THEREOF AND ARTICLES COMPRISING THE SAME

BACKGROUND

This disclosure relates to thermal barrier coating compositions, methods of manufacture thereof and articles comprising the same. The present disclosure relates to thermal barrier coating compositions designed to prevent infiltration and degradation by molten deposits formed from environmental contaminants.

Gas turbine engines typically include a compressor to pressurize airflow, a combustor to burn a hydrocarbon fuel in the presence of the pressurized air, and a turbine to extract energy from the resultant combustion gases. The combustor and the turbine from the hot section of the engine and components therein often include protective multi-layer thermal barrier coatings (TBC).

The thermal insulation, radiant heat reflection, and oxidation protection provided by the TBC enables hot section components to survive higher operating temperatures, thereby increasing component lifetimes and improving engine durability. The TBC is typically a refractory ceramic material deposited on a bond coat to form what may be termed a TBC system. Bond coat materials widely used in TBC systems include oxidation-resistant overlay coatings such as MCrAlY (where M is iron, cobalt, nickel, platinum or mixtures thereof, Cr is chromium; Al is aluminum and Y is yttrium), and diffusion coatings such as diffusion aluminides that contain aluminum intermetallics.

Ceramic materials and particularly binary yttria-stabilized zirconia (YSZ) are widely used as TBC materials because of their high temperature capability, low thermal conductivity, and relative ease of deposition such as by air plasma spraying (APS), flame spraying such as high-velocity oxy-fuel (HVOF), physical vapor deposition (PVD) and other techniques.

Under service conditions, these TBC coated hot section engine components can be susceptible to various modes of damage, including erosion, oxidation and corrosion from exposure to the gaseous products of combustion, foreign object damage and attack from environmental contaminants. These contaminants, CMAS (referring to their mixed calcium magnesium aluminum silicon oxide or CaO—MgO—$Al_2O_3$—$SiO_2$ composition), volcanic ash, or fly ash, can adhere to the TBC surfaces of the hot section components. The interaction between the TBC and contaminants may result in premature TBC loss over the life of the components. For example, CMAS particulates are often contained in the atmosphere of areas having fine sand and/or dust. CMAS infiltration is a phenomenon that is linked to TBC spallation. The CMAS may melt on the hot section components, which may lead to penetration of the porous, and strain tolerant, TBC microstructure. On cooling, this penetrated layer stiffens and the induced strain energy can lead to TBC spallation.

Rare earth zirconates are often utilized to react with the encroaching CMAS melt which may decrease the depth of infiltration of the melt and hence the strain energy introduced into the coating to prevent extensive coating spallation. However, the formation and survival of this reaction layer is not readily controllable in service, as a number of extrinsic factors such as CMAS deposition rate, surface temperatures, airflow, erosion of the TBC, and foreign object damage may result in variation in penetration depth and the potential resultant damage.

SUMMARY

Disclosed herein is a process for coating a component, comprising applying a bond coat on a substrate of a component; applying a thermal barrier material to the bond coat; and applying a coating containing polynuclear aluminum oxide/hydroxide clusters, to the thermal barrier material.

In an embodiment, the polynuclear aluminum oxide/hydroxide clusters are $Al_{13}$ Keggin clusters having the formula $[AlO_4Al_{12}(OH)_{24}(H_2O)_{12}]^{7+}$, or $Al_{13}$ Keggin complexes that are salts of the $Al_{13}$ Keggin clusters.

In an embodiment, an $Al_{13}$ Keggin complex has the formula $\{[AlO_4Al_{12}(OH)_{24}(H_2O)_{12}]^{7+}*7NO_3^-\}$.

In another embodiment, the process further comprises obtaining the $Al_{13}$ Keggin clusters and/or the $Al_{13}$ Keggin complexes by base neutralization of an aluminum salt solution, where the salt solution comprises a total aluminum concentration of about 0.02 to about 2.0 moles/liter, to obtain an ($OH^-$/Al) mole ratio of about 2.1 to about 2.6.

In another embodiment, the process further comprises obtaining the $Al_{13}$ Keggin clusters and/or the $Al_{13}$ Keggin complexes by base neutralization of an aluminum salt solution, where the salt solution comprises a total aluminum concentration of about 0.02 to about 2.0 moles/liter, to obtain an ($OH^-$/Al) mole ratio of about 2.2 to about 2.4.

In yet another embodiment, the process further comprises preparing the coating from a solution that comprises the $Al_{13}$ Keggin clusters and/or the $Al_{13}$ Keggin complexes in an amount of about 0.007 to about 0.07 moles/liter of the solution; where the solution comprises water or an organic solvent.

In yet another embodiment, the process further comprises precipitating the $Al_{13}$ Keggin clusters and/or the $Al_{13}$ Keggin complexes from a solution and collecting the $Al_{13}$ Keggin clusters and/or the $Al_{13}$ Keggin complexes by filtration, and drying the solution to form $Al_{13}$ Keggin cluster and/or $Al_{13}$ Keggin complex powder.

In yet another embodiment, the process further comprises redissolving the $Al_{13}$ Keggin cluster and/or $Al_{13}$ Keggin complex powder in water with a polymeric binder to form the coating.

The coating is applied by painting, spraying, electrostatic spraying, or spin-coating.

In an embodiment, the process further comprises drying the $Al_{13}$ Keggin clusters to form a pre-condensed coating of hydrated pseudo-boehmite ($AlOOH*H_2O$), aluminum trihydroxide, or a combination thereof.

In another embodiment, the process further comprises heat treating the coating to form a fully dense transition alumina coating, selected from the group consisting of $\chi$-$Al_2O_3$, $\eta$-$Al_2O_3$ and $\gamma$-$Al_2O_3$ that has a thickness of about 1 to about 1000 nanometers.

In yet another embodiment, the process comprises coagulating the $Al_{13}$ Keggin clusters and/or the $Al_{13}$ Keggin complexes with an aqueous solution of sodium silicate, where the sodium silicate is present in an amount of about 0.01 to about 0.1 moles/liter to form a hydroxy aluminosilicate compound, where the sodium silicates comprise sodium meta-silicate, sodium orthosilicate, disodium disilicate, or a combination thereof. The Al/Si atomic ratio ranges from about 5:1 to about 15:1.

In an embodiment, when the coating comprises the $Al_{13}$ Keggin cluster and the hydroxy aluminosilicate compound and wherein the coating is applied by dipping, painting, spraying, electrostatic spraying, spin-coating, or a combination thereof.

Disclosed herein too is a gas turbine engine component, comprising a superalloy substrate; a bond coat on the substrate; a thermal barrier material on the bond coat; and a coating containing polynuclear aluminum oxide/hydroxide clusters on the thermal barrier material.

In an embodiment, the polynuclear aluminum oxide/hydroxide clusters are $Al_{13}$ Keggin clusters having the formula $[AlO_4Al_{12}(OH)_{24}(H_2O)_{12}]^{7+}$, or $Al_{13}$ Keggin complexes that are salts of the $Al_{13}$ Keggin clusters.

In an embodiment, an $Al_{13}$ Keggin complex has the formula $\{[AlO_4Al_{12}(OH)_{24}(H_2O)_{12}]^{7+}*7NO_3^-\}$.

In an embodiment, the coating further comprises a hydroxy aluminosilicate compound formed by coagulating the $Al_{13}$ Keggin clusters and/or the $Al_{13}$ Keggin complexes with an aqueous solution of sodium silicate, where the sodium silicate is present in an amount of about 0.01 to about 0.1 moles/liter in a solution that contains the $Al_{13}$ Keggin clusters and/or the $Al_{13}$ Keggin complexes, where the sodium silicates comprise sodium meta-silicate, sodium orthosilicate, disodium disilicate, or a combination thereof.

In yet another embodiment, the coating comprises the $Al_{13}$ Keggin clusters and/or the $Al_{13}$ Keggin complexes in an amount of about 0.007 to about 0.07 moles/liter.

In an embodiment, the coating comprises the $Al_{13}$ Keggin clusters and/or the $Al_{13}$ Keggin complexes are dried to form a pre-condensed coating of hydrated pseudo-boehmite ($AlOOH*H_2O$), aluminum trihydroxide, or a combination thereof.

In an embodiment, the coating can be transformed to a fully dense transition alumina coating selected from the group consisting of $\chi$-$Al_2O_3$, $\eta$-$Al_2O_3$, or $\gamma$-$Al_2O_3$, where the coating thickness is about 1 to about 1000 nanometers.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
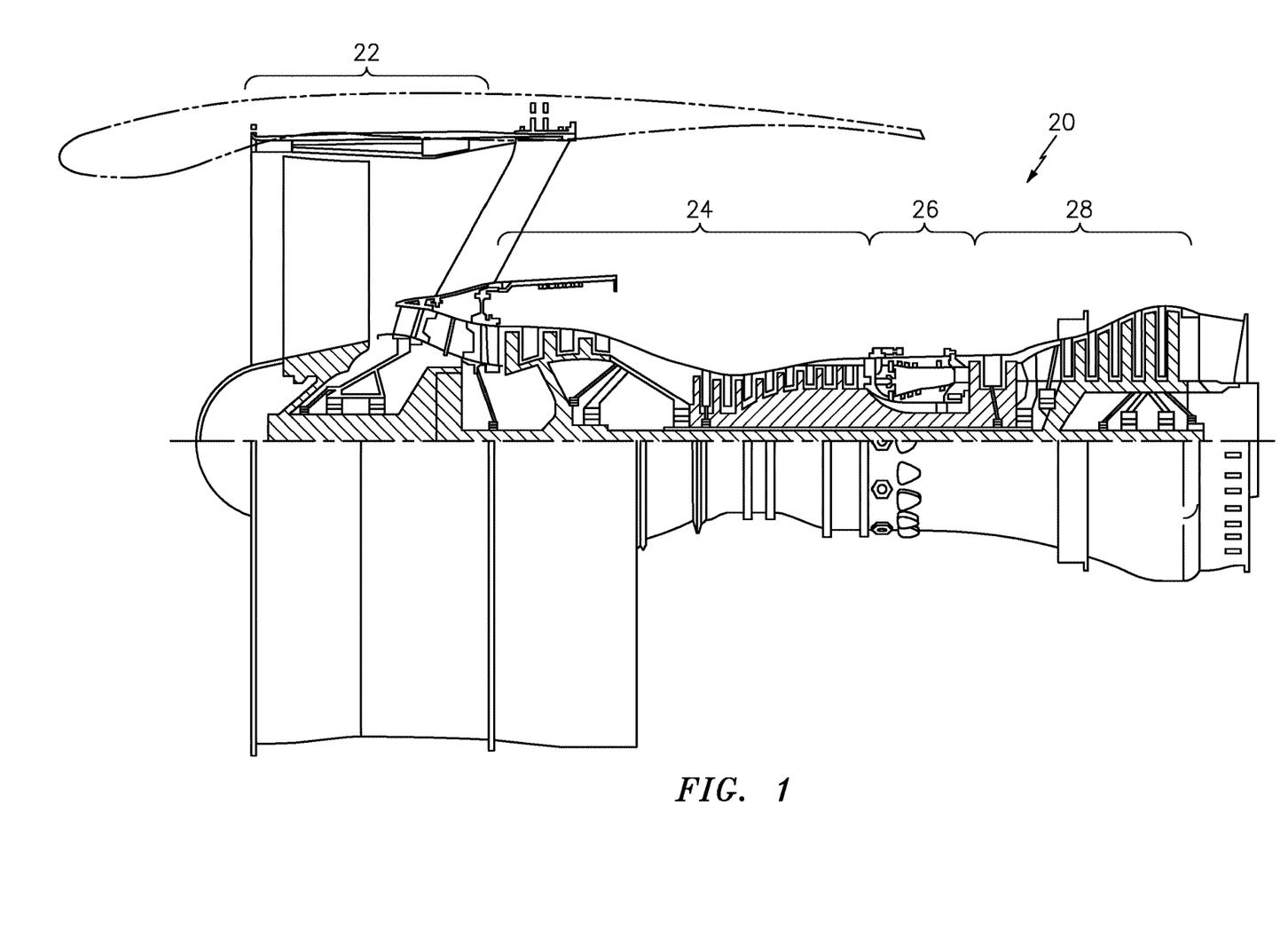
FIG. 1 is a schematic cross-section of an example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbomachinery to include, but not be limited to, low bypass augmented turbofans, turbojets, turboshafts, three-spool (plus fan) turbofans and industrial gas turbines.

Figure 2:
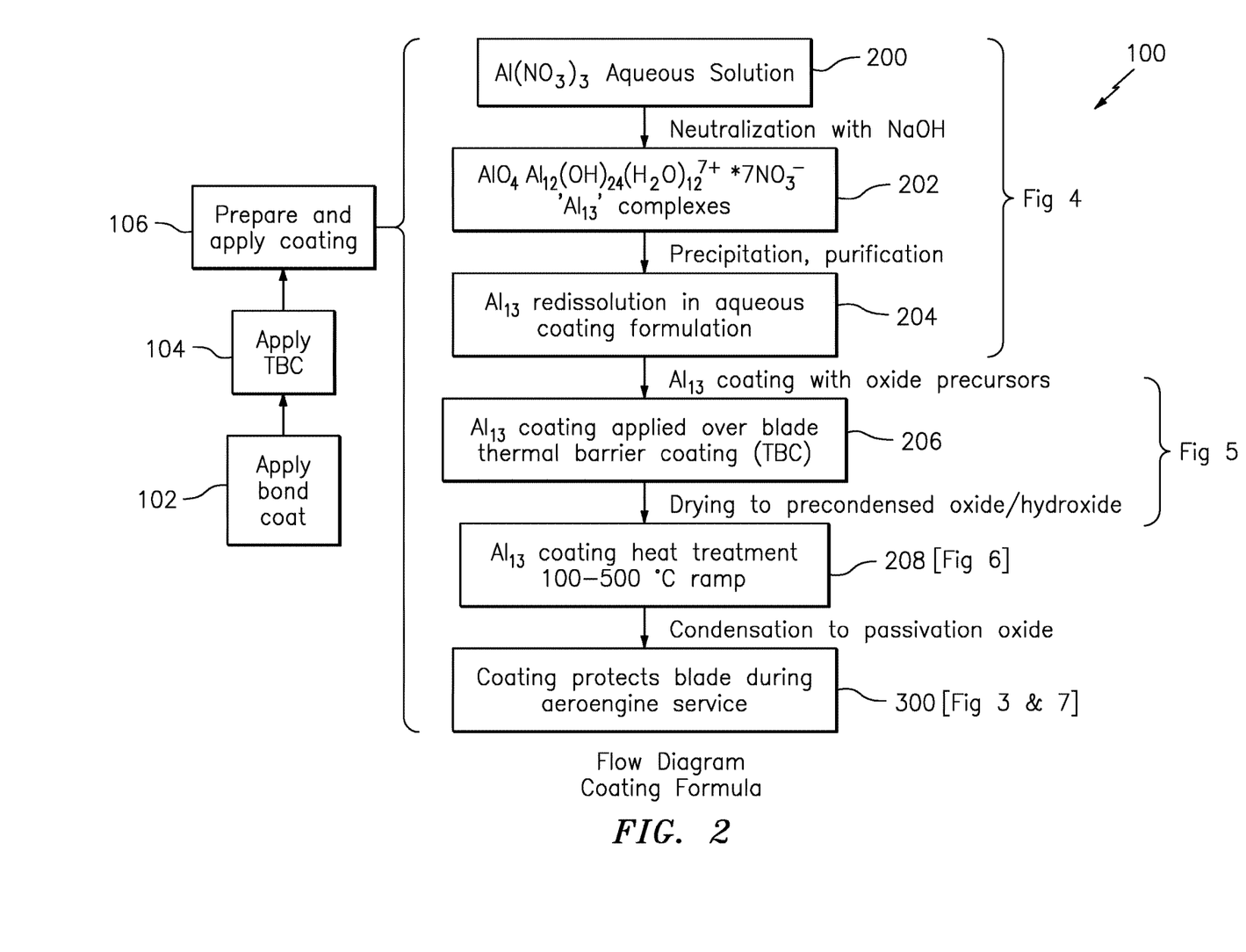
FIG. 2 is a flowchart of a process according to one disclosed non-limiting embodiment for application of a coating system to a component.

With reference to FIG. 2, a process 100 according to one disclosed non-limiting embodiment for application of a coating 40 to a component 42 (FIG. 3) subjected to high temperatures is schematically represented. The steps of the process 100 are schematically disclosed in terms of functional block diagrams as a flowchart. It should be appreciated that alternative of additional steps may be provided without departing from the teaching herein.

Figure 3:
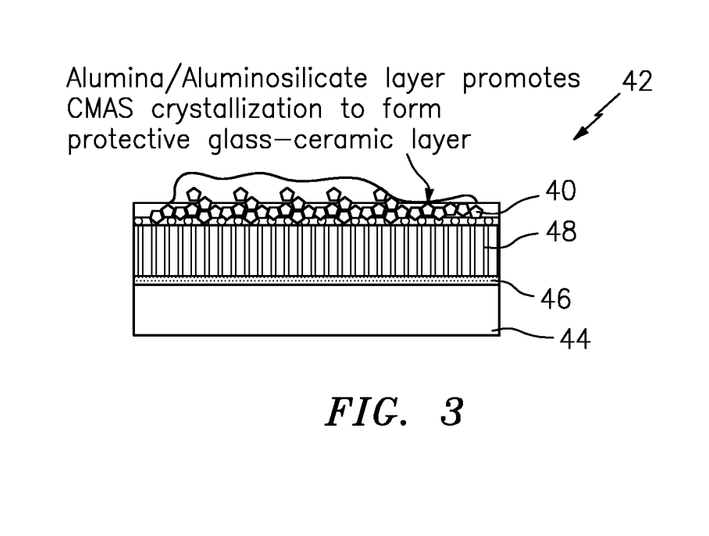
FIG. 3 is a cross-section through a component with an alumina/aluminosilicate compound layer that promotes CMAS crystallization to form a protective glass-ceramic seal.

Representative examples of the component 42 include but are not limited to combustor section 26 and/or turbine section 28 hardware, such as, augmentor components, combustor liners, blades, vanes, and blade outer air seals. The coating 40 as described herein is suitable for protection of a substrate 44 such as a nickel superalloy but while being described with reference to such superalloy gas turbine engine components, the teachings herein are generally applicable to any component on which a TBC may be used to protect the component from a high temperature environment, particularly environments containing CMAS.

Definitions:

The polynuclear aluminum oxide/hydroxide cluster $[AlO_4Al_{12}(OH)_{24}(H_2O)_{12}]^{7+}$ is referred to as an $Al_{13}$ Keggin cluster.

The polynuclear aluminum oxide/hydroxide complex with $NO_3^-$ counter-ions, $\{[AlO_4Al_{12}(OH)_{24}(H_2O)_{12}]^{7+}*7NO_3^-\}$, is referred to as an $Al_{13}$ Keggin complex.

A liquid coating formulation formed from $Al_{13}$ and sodium silicate forms the polynuclear Al and Si oxide/hydroxide precursors.

A pre-condensed Al or Al—Si oxide/hydroxide layer is formed from a dried coating of polynuclear Al and Si oxide/hydroxide precursors.

A condensed alumina/aluminosilicate compound layer is formed by heat-treating the pre-condensed Al or Al—Si oxide/hydroxide layer.

A glass-ceramic layer is formed from the reaction of alumina/aluminosilicate coating with CMAS.

The process 100 initially includes the application of a bond coat 46 to a substrate 44 (see step 102 in the FIG. 3). The substrate 44 is subjected to cleaning and preparation prior to disposing the bond coat 46 on it. (See 106 in FIG. 2) FIG. 3 is a cross-section through a component with an alumina/aluminosilicate compound layer that promotes CMAS crystallization to form a protective glass-ceramic seal. The bond coat 46 may include an aluminum-rich composition, such as an overlay coating or a diffusion coating such as a diffusion aluminide or a diffusion platinum aluminide having formulas such as MCrAlY, MCrAlY+Hf, and MCrAlY+Hf+Si, in which M denotes nickel, cobalt, iron, platinum or mixtures thereof; Cr denotes chromium; Al denotes aluminum; Y denotes yttrium; Hf denotes hafnium; and Si denotes silicon. MCrAlY materials are often referred to as overlay coatings because they are applied in a predetermined composition and do not interact significantly with the substrate 44 during the deposition process. One exemplary preferred MCrAlY+Hf+Si bond coat composition has a weight percent compositional range of about 5 to about 40 Cr, about 8 to about 35 Al, about 0.1 to about 2.0 Y, about 0.1 to about 2.0 Hf, about 0.1 to about 7 Si, with the balance being selected from the group consisting of Ni, Co and mixtures thereof. Alternatively, or in addition, the bond coat material may include Al, PtAl, and the like, that are often referred to as diffusion coatings. Alternatively, or in addition, the bond coat material may also include Al, PtAl, MCrAlY as described above, and the like, that are often referred to as cathodic arc coatings.

The bond coat 46 may be applied by any method operable to produce a dense, uniform, adherent coating of the desired composition, such as, but not limited to, an overlay bond coat, diffusion bond coat, cathodic arc bond coat, and the like. Such techniques may include, but are not limited to, diffusion processes (e.g., inward, outward, and the like), low pressure plasma-spray, air plasma-spray, sputtering, cathodic arc, electron beam physical vapor deposition, high velocity plasma spray techniques (e.g., HVOF, HVAF, and the like), combustion processes, wire spray techniques, laser beam cladding, electron beam cladding, and the like.

The particle size for the bond coat 46 may be of any suitable size, and may be between about 15 microns (0.015 mm) and about 60 microns (0.060 mm) with a mean particle size of about 25 microns (0.025 mm). The bond coat 46 may be applied to any suitable thickness, and may be about 5 mils (0.127 mm) to about 10 mils (0.254 mm) thick. In some embodiments, the thickness may be about 6 mils (0.152 mm) to about 7 mils (0.178 mm) thick.

Next, a thermal barrier material 48 (FIG. 3) may be applied to the bond coat 46 (step 104). The thermal barrier material 48 may include a ceramic-based compound. Representative thermal barrier materials include, but are not limited to, a stabilized zirconate, a stabilized hafnate, combinations including at least one of the foregoing compounds, and the like, for example, yttria-stabilized zirconia, calcia-stabilized zirconia, magnesia-stabilized zirconia, yttria-stabilized hafnia, calcia-stabilized hafnia and magnesia-stabilized hafnia. Yttria-stabilized zirconia is commercially available as 7YSZ. One example preferred thermal barrier material 48 is a zirconia stabilized by between about 6 to about 8 wt % yttria that is about 0.05 to about 5 mil (about 0.00127 to about 0.127 mm) in thickness deposited, nominally at about 1 to about 3 mil (about 0.0254 to about 0.0761 mm).

The thermal barrier material 48 may be applied by various known methods. Suitable application methods include, but are not limited to, physical vapor deposition (e.g., electron beam), thermal spray (e.g., air plasma, high velocity oxygen fuel), sputtering, sol gel, slurry, combinations comprising at least one of the foregoing application processes, and the like.

Figure 4:
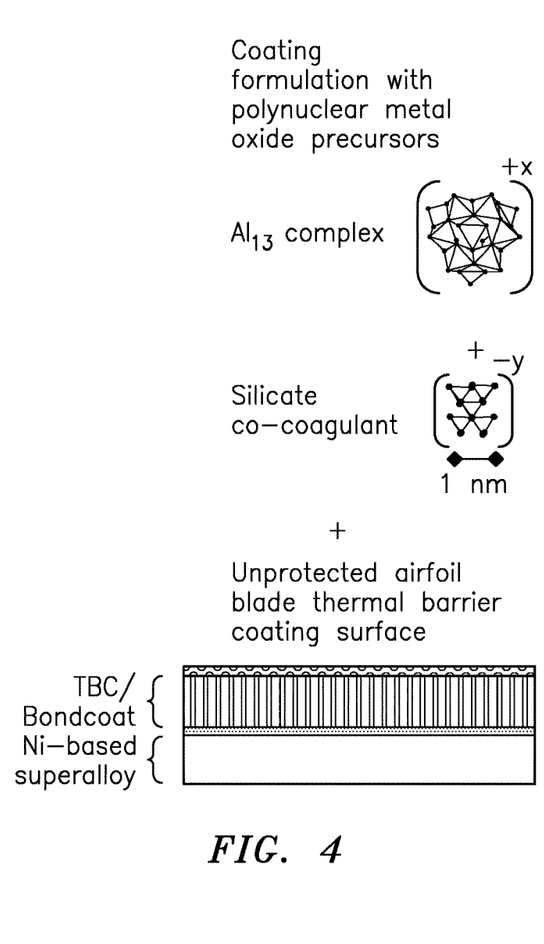
FIG. 4 is a cross-section through the component showing the coating formulation containing polynuclear aluminum oxide/hydroxide complex, referred to as '$Al_{13}$ Keggin complex,' and silica oxide/hydroxide co-coagulant precursors.

The coating 40 comprising polynuclear aluminum oxide/hydroxide clusters (hereinafter the "coating") is then prepared for application to the thermal barrier material 48. FIG. 4 is a cross-section through the component showing the coating formulation containing polynuclear aluminum oxide/hydroxide clusters, referred to as '$Al_{13}$ Keggin complexes' or '$Al_{13}$ complexes', and silica oxide/hydroxide precursors.

The coating is manufactured by reacting an aluminum salt with a base in a solution to produce an $Al_{13}$ cluster or an $Al_{13}$ complex. In an embodiment, the coating may comprise the $Al_{13}$ cluster or the $Al_{13}$ complex in its original solution. In another embodiment, the $Al_{13}$ cluster or the $Al_{13}$ complex may be precipitated from solution, purified and dried to form a powder. The powder may then be dissolved or suspended in another solution (a second solution) and disposed upon the thermal barrier coating to form the coating. In an embodiment, a polymeric binder may be added to the second solution and disposed upon the thermal barrier coating to form the coating. Upon being disposed on the thermal barrier coating, the coating may be heat treated to volatilize solvents or to degrade the polymeric binder.

In another embodiment, the $Al_{13}$ cluster or a complex may be coagulated with a sodium silicate to form a hydroxy aluminosilicate. The hydroxy aluminosilicate along with the $Al_{13}$ cluster or complexes in solution may be applied as a coating and dried. In an embodiment, a polymeric binder may be added to the solution containing the hydroxy aluminosilicate along with the $Al_{13}$ cluster or complexes. During drying, the $Al_{13}$ complexes aggregate to form hydrated pseudo-boehmite ($AlOOH*H_2O$), aluminum trihydroxide, or a combination thereof. The coating can be transformed to a fully dense transition alumina coating comprising $\chi$-$Al_2O_3$, $\eta$-$Al_2O_3$, or $\gamma$-$Al_2O_3$ upon being heat treated.

Preparation of the coating 40 is initiated via preparation of an aqueous aluminum salt solution (step 200; FIG. 4), containing a total Al concentration of about 0.02 to about 2.0 moles/liter. The aqueous solution of, for example, aluminum nitrate, $Al(NO_3)_3$, with a total Al concentration of about 0.1 to 0.6 moles per liter, preferably about 0.2 to about 0.5 moles/liter, is formed under continuous stirring. Other aluminum salts can be used, either in conjunction with or in lieu of the aluminum nitrate, such as, for example: $AlCl_3$, $Al(CH_3CO_2)_3$ (aluminium triacetate), and $Al[OCH(CH_3)C_2H_5]_3$ (Al tri sec-butoxide). The solution is slowly titrated with a base, such as, for example, about 0.1 to about 0.6 moles per liter, preferably about 0.2 to about 0.5 moles/liter sodium hydroxide, NaOH, solution at about 70° C., until the $[OH^-]/[Al]$ molar ratio is between about 2.1 to about 2.6, preferably about 2.2 to about 2.4 and the pH is between about 4 to about 7. Examples of other bases that can be used in the aqueous solution include NaOH, KOH, $Mg(OH)_2$, $Ca(OH)_2$, $NaHCO_3$ (sodium bicarbonate) and $Na_2CO_3$ (sodium carbonate).

The result of the neutralization of $Al(NO_3)_3$ with the base is the formation of a high yield of polynuclear aluminum oxide/hydroxide clusters, $[AlO_4Al_{12}(OH)_{24}(H_2O)_{12}]^{7+}$, referred to as '$Al_{13}$ clusters' or '$Al_{13}$ Keggin clusters', complexed with nitrate counter-ions, having the formula $\{[AlO_4Al_{12}(OH)_{24}(H_2O)_{12}]^{7+}*7NO_3^-\}$ (referred to as an '$Al_{13}$ complex' or an '$Al_{13}$ Keggin complex') in solution (Step 202).

Various salts ($Al_{13}$ complexes) of the $Al_{11}$ Keggin clusters may be formed and the salts are dependent upon the aluminum salt used to initiate the process of manufacturing the cluster. If other Al salts (other than aluminum nitrate) are used as precursors, the counter-ions in the $Al_{13}$ Keggin complex will be formed from the salt anions of the precursor. For example, $\{[AlO_4Al_{12}(OH)_{24}(H_2O)_{12}]^{7+}*7Cl^-\}$ will be formed from $AlCl_3$ neutralization. The $Al_{13}$ cluster is the most prevalent large polynuclear Al species. One other known large Al species has the formula $Al_2O_8Al_{28}(OH)_{56}$ $(H_2O)_{26}]^{18+}$, referred to as the 'Al$_{30}$ cluster', and is formed by the condensation of two Al$_{13}$ clusters bridged with 4 monomeric Al ions. The Al$_{13}$ clusters can also undergo condensation reactions to form higher molecular weight polymers, consisting of Al$_{13}$ repeating units, especially under alkaline conditions.

These Al$_{13}$ complexes can also be synthesized by electroless reduction of Al(NO$_3$)$_3$ or other aluminum salt solutions. Alternatively, the Al$_{13}$ complexes can be prepared by aqueous electrolysis using sacrificial Al anodes, following a similar method to Al electro-coagulation technologies employed for water purification.

The tailored surface passivation layer can be deposited directly from the aqueous solution or dispersion containing the metastable polynuclear Al oxide/hydroxide precursors, following the process flow diagram illustrated in FIG. 2. The Al$_{13}$ clusters are all about 1.0 to about 1.8 nanometers (nm), preferably about 1.2 to about 1.7 nm in diameter and Al$_{30}$ clusters are all approximately 3 nm in length. The Al$_{13}$ repeating units can polymerize or flocculate to form higher molecular weight polymers, which will precipitate out of solution. After synthesis, the Al$_{13}$ clusters and complexes can be precipitated by raising the solution pH, and further separating them by drying or concentrating them by other methods. The precipitates can be purified by washing in ethanol and redissolved in a coating formulation comprising Al$_{13}$ cluster or complex concentrations of about 0.007 to about 0.07 moles/liter in an aqueous solution or in an organic solvent. This is detailed below.

In another instance, the coating can be deposited onto the thermal barrier coating from an aqueous solution or from a dispersion containing the reaction products of polynuclear Al and Si oxide/hydroxide precursors, having an Al/Si atomic ratio varying from about 5:1 to about 15:1. This is carried out by coagulating the Al$_{13}$ clusters with sodium silicate, where the sodium silicate is present in varying amounts of about 0.01 to about 0.1 moles/liter of an aqueous solution. The sodium silicates are sodium meta-silicate (Na$_2$SiO$_3$), sodium orthosilicate (Na$_4$SiO$_4$), and disodium disilicate (Na$_2$Si$_2$O$_5$).

Figure 5:
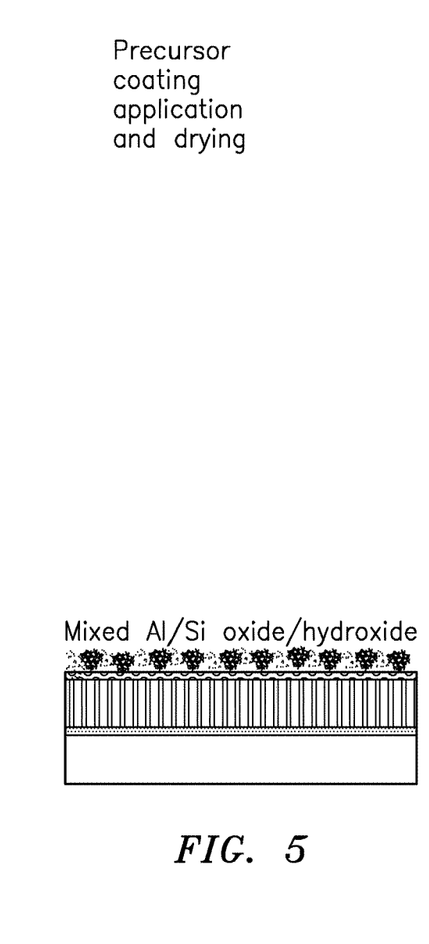
FIG. 5 is a cross-section through the component showing the mixed Al and Si oxide/hydroxide coating application and drying.

The sodium silicates are first dissolved in water to form polynuclear silicic acid clusters (Si$_x$O$_y$H$_z$). The silicic acid clusters react with the Al$_{13}$ clusters to form less soluble hydroxy aluminosilicate oligomers that vary in character with the Si/Al ratio, pH, and preparation conditions. The hydroxy aluminosilicate formation reduces the Al$_{13}$ concentration in proportion to the Si/Al ratio. The Al$_{13}$/hydroxy aluminosilicate products are collected by filtration, purified by washing in ethanol and then dried. Next, the Al$_{13}$/hydroxy aluminosilicate products are re-suspended in water to form a coating liquid formulation (step 204; FIG. 5).

In an embodiment, the Al$_{13}$ or Al$_{13}$/hydroxy aluminosilicate products can be reconstituted in an intermediate to high pH solution, concentrated aqueous solution or an organic solvent dispersion. The Al$_{13}$ or Al$_{13}$/hydroxy aluminosilicate products are present in concentrations of about 0.007 to about 0.07 moles/liter of the solution. Solvents and dispersion media include, but are not limited to, water, alcohols (methanol, ethanol, isopropanol, butanol, and the like), acetic acid, formic acid, N, N-dimethylformamide, ethyl acetate, tetrahydrofuran, acetone, or a combination thereof. The coating solution or dispersion formula can also contain water-soluble or polar organic solvent-soluble polymeric binders, like poly(vinyl pyrrolidone), polyacrylamides, polyacrylates, poly(acrylic acids), poly(vinyl alcohol), poly(ethylene oxides) or poly(ethylene glycols), polyethyleneimines, polyurethanes, and polyamines.

Polymers that are not water soluble may also be used. The polymers can include thermoplastic polymers or thermosetting polymeric binders. Suitable non-water soluble thermoplastic polymeric binders include polyolefins, polystyrene, polymethylmethacrylate, polyimides, polysulfones, polyethersulfones, polyetherimides, polysiloxanes, polycarbonates, polyphenylene ethers, or the like, or a combination thereof. Suitable non-water soluble thermosetting polymeric binders include polyepoxides, phenolics, polyurethanes, polysiloxanes, polyisoprene, polybutadiene, or the like, or a combination thereof.

In addition, ingredients like buffer species, co-coagulants, corrosion-inhibitors, chelating agents, or monomeric metal ions can be used to accelerate coagulation, deposition, and adhesion to the component substrate.

The Al$_{11}$ or Al$_{13}$/hydroxy aluminosilicate products are used in conjunction with a binder in an amount of 2 to 25 wt %, preferably 5 to 20 wt %, and more preferably 8 to 15 wt %, based on the total weight of the Al$_{13}$ or Al$_{13}$/hydroxy aluminosilicate products and the binder.

The liquid coating is then applied over the thermal barrier material 48 (Step 206; FIG. 5). The liquid coating is applied by dipping, painting, spraying, electrostatic spray, or spin-coating on the thermal barrier material 48. The viscosity of the precursor coating liquid is high enough to limit its infiltration into the thermal barrier material 48 intergranular gaps.

The coating is dried, to form a pre-condensed Al or Al—Si oxide/hydroxide layer, depending on the original liquid coating composition. During drying, the Al$_{13}$ complexes may aggregate to form hydrated pseudo-boehmite (AlOOH*H$_2$O) nanocrystallites and/or aluminum trihydroxide nanocrystallites that range from about 5 to about 500 nm in size, as well as amorphous phases. During drying, the mixed Al—Si oxides/hydroxides remain amorphous in character.

Figure 6:
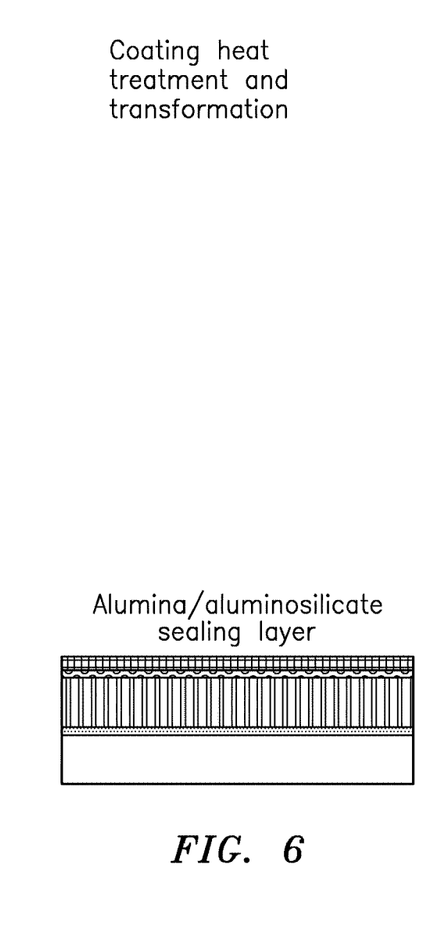
FIG. 6 is a cross-section through the component showing the coating heat treatment and precursor transformation to alumina/aluminosilicate compound layer.

The coating layer is then condensed by heating the component (Step 208; FIG. 6). For example, the component may be heated to a temperature ranging between about 250 to about 500° C. for about two hours such as during a "green" run. During heating, ramp up over temperatures of about 100 to about 500° C. will cause any remaining water, ligands, and non-metallic counter-ions or additives present in the coating to desorb or to decompose. The pseudo-boehmite or aluminum trihydroxide transforms to a fully dense transition-alumina phase ($\chi$-Al$_2$O$_3$, $\eta$-Al$_2$O$_3$ or $\gamma$-Al$_2$O$_3$), and the Al—Si oxides/hydroxides transform to an amorphous aluminosilicate matrix. Full alumina nanocrystallite transformation to $\alpha$-Al$_2$O$_3$ is possible at temperatures above 1000° C. Sintering can occur at even higher temperatures, ca. above 1100° C.

The condensed coating caps the intergranular gaps in the thermal barrier material 48 at their opening to the surface, providing a first level passivation protection to delay CMAS ingress (Step 300). Once the Al-rich nanocrystallites are contacted by molten CMAS, they can initiate partial CMAS crystallization to a glass-ceramic type phase. In one example, the coating thickness is between about 1 to about 1000 nm.

Figure 7:
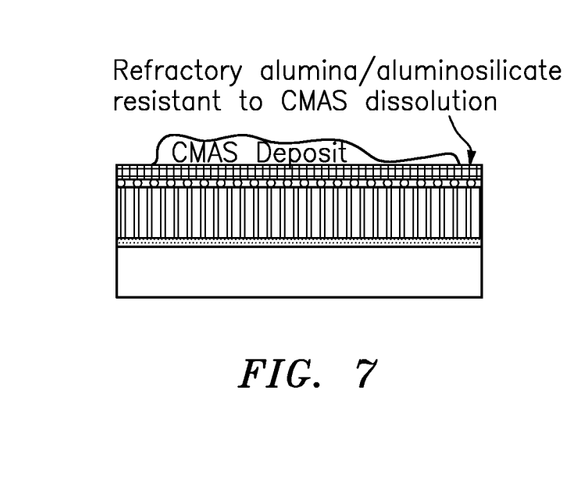
FIG. 7 is a cross-section through the component showing the alumina/aluminosilicate compound resistant to CMAS dissolution.

Nanocrystallites in contact with CMAS liquid (FIG. 7) can operate as nuclei that accelerate kinetics for crystallizing intrinsic CMAS phases, such as anorthrite [CaAl$_2$Si$_2$O$_8$], diopside [CaMgSi$_2$O$_6$], and pseudo-wollastonite [CaSiO$_3$], and the like. Nanocrystallites can be dissolved in CMAS bulk, locally shifting reaction equilibria (Le Chatelier's principle) towards crystallization of Al-rich phases, such as: anorthrite, melilite [Ca$_2$Al$_2$SiO$_7$], spinel [MgAl$_2$O$_4$ or MgAl$_2$O$_7$]. The glass-ceramic structure has significantly higher viscosity, prevents CMAS infiltration and dissolution into the thermal barrier material 48. The glass-ceramic forms a fully dense, impervious surface layer (glass-ceramics are used as sealants).

Co-coagulants, counter-ions, or ligands are formulated in the coating 40 to tailor composition and properties of CMAS intrinsic crystallization products. Co-coagulants, such as metal oxide clusters, including those formed with the oxides of the metals (Me): Si, Mo, W, V, Fe, Zn, and Cu, can be combined with Al$_{13}$ Keggin complexes to facilitate self-assembly into 3D structures, i.e., to form larger sized precipitates. The co-coagulants contain metal oxides, Me$_x$O$_y$, that are added so that the Al/Me atomic ratio is within the range of about 1.5:1 to about 15:1. These other metal oxides may modify the precipitate crystalline ordering, enhance phase transformation kinetics of the coating consolidation, and/or act as nucleation agents for CMAS crystallization.

Polyaluminosilicate precipitates can be formed when a significant fraction of sodium silicate co-coagulants are combined with the Al$_{13}$ Keggin clusters, such as in the naturally occurring zunyite aluminosilicate halide mineral, Al$_{13}$Si$_5$O$_{20}$(OH,F)$_{18}$Cl, which contains a combination of Si$_5$O$_{16}$ and Al$_{13}$ units. The polyaluminosilicates with the Al/Si atomic ratio varying from about 5:1 to about 15:1, contain a mixture of Al$_{13}$ complexes and aluminosilicate oligomers. The coating 40 prepared from the Al$_{13}$ complexes or the Al$_{11}$/aluminosilicate mixtures can either nucleate the crystallization of intrinsic CMAS phases, or locally shift the equilibria towards the formation of more stable phases containing Al and Si, such as: andalusite, kyanite or sillimanite (Al$_2$SiO$_5$); and mullite (Al$_6$Si$_2$O$_{13}$).

The Al$_{13}$ Keggin complexes and polyaluminosilicates can complex with metal ions (this is an important feature that is commonly used for water purification). Metallic counter-ions, Me$^{+n}$, where n=2 to 4, with the Al/Me atomic ratio varying from about 10:1 to about 40:1. Some transition metal ions, e.g., Ti$^{+3/+4}$, Fe$^{+2/+3}$, and Mn$^{+2/+4}$, are known nucleation agents used commercially for CMAS crystallization to form glass-ceramic products. Pre-condensed Al$_{13}$ Keggin complexes seeded with these metal ions, may release these ions or their oxides during subsequent condensation reactions or during contact with molten CMAS phases (FIG. 7), in order that they can facilitate CMAS crystallization (FIG. 3).

The outer bound waters on the Al$_{13}$ Keggin complexes can be exchanged with other ligands, such as F ions, carboxylic acids, and alcohols, where the maximum substitution is determined by charge neutralization requirements. Substitution of negatively charged ligands, e.g., F and carboxylate ions, will reduce the number of counter-ions in the outer coordination sphere. These ligands may be used to alter the Al$_{13}$ Keggin complexes or co-coagulant stability or reactivity, and solubility or dispersibility in the pre-condensed liquid coating, as well as possibly during subsequent condensation reactions.

The use of the terms "a" and "an" and "the" and similar references in the context of description (especially in the context of the following claims) are to be construed to cover both the singular and the plural, unless otherwise indicated herein or specifically contradicted by context. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A process for coating a component, comprising:
applying a bond coat on a substrate of a component;
applying a thermal barrier material to the bond coat; and
applying a coating containing polynuclear aluminum oxide/hydroxide clusters, to the thermal barrier material; wherein the polynuclear aluminum oxide/hydroxide clusters are Al$_{13}$ Keggin clusters having the formula [AlO$_4$Al$_{12}$(OH)$_{24}$(H$_2$O)$_{12}$]$^{7+}$, or are Al$_{13}$ Keggin complexes of salts of the Al$_{13}$ Keggin clusters, wherein the Al$_{13}$ Keggin complex has the formula {[AlO$_4$Al$_{12}$(OH)$_{24}$(H$_2$O)$_{12}$]$^{7+}$*7NO$_3^-$}.

2. The process of claim 1, wherein the Al$_{13}$ Keggin complex has the formula {[AlO$_4$Al$_{12}$(OH)$_{24}$(H$_2$O)$_{12}$]$^{7+}$*7NO$_3^-$}.

3. The process of claim 1, further comprising obtaining the Al$_{13}$ Keggin clusters or the Al$_{13}$ Keggin complexes by base neutralization of an aluminum salt solution, where the salt solution comprises a total aluminum concentration of about 0.02 to about 2.0 moles/liter, to obtain an (OH$^-$/Al) mole ratio of about 2.1 to about 2.6.

4. The process of claim 1, further comprising obtaining the Al$_{13}$ Keggin clusters or the Al$_{13}$ Keggin complexes by base neutralization of an aluminum salt solution, where the salt solution comprises a total aluminum concentration of about 0.02 to about 2.0 moles/liter, to obtain an (OH$^-$/Al) mole ratio of about 2.2 to about 2.4.

5. The process of claim 1, further comprising preparing the coating from a solution that comprises the Al$_{13}$ Keggin clusters or the Al$_{13}$ Keggin complexes in an amount of about 0.007 to about 0.07 moles/liter of the solution; where the solution comprises water or an organic solvent.

6. The process of claim 5, further comprising precipitating the Al$_{13}$ Keggin clusters or the Al$_{13}$ Keggin complexes from a solution and collecting the Al$_{13}$ Keggin clusters or the Al$_{13}$ Keggin complexes by filtration, and drying the solution to form Al$_{13}$ Keggin cluster and/or Al$_{13}$ Keggin complex powder.

7. The process of claim 6, further comprising dissolving the Al$_{13}$ Keggin cluster or Al$_{13}$ Keggin complex powder in water with a polymeric binder to form the coating.

8. The process of claim 1, wherein the coating is applied by painting, spraying, electrostatic spraying, or spin-coating.

9. The process of claim 1, further comprising drying the $Al_{13}$ Keggin clusters to form a pre-condensed coating of hydrated pseudo-boehmite (AlOOH*$H_2O$), aluminum trihydroxide, or a combination thereof.

10. The process of claim 1, further comprising heat treating the coating to form a fully dense transition alumina coating selected from the group consisting of $\chi$-$Al_2O_3$, $\eta$-$Al_2O_3$ and $\gamma$-$Al_2O_3$ that has a thickness of about 1 to about 1000 nanometers.

11. The process of claim 1, further comprising coagulating the $Al_{13}$ Keggin clusters or the $Al_{13}$ Keggin complexes with an aqueous solution of sodium silicate, where the sodium silicate is present in an amount of about 0.01 to about 0.1 moles/liter to form a hydroxy aluminosilicate compound, where the sodium silicates comprise sodium meta-silicate, sodium orthosilicate, disodium disilicate, or a combination thereof.

12. The process of claim 11, wherein an Al/Si atomic ratio ranges from about 5:1 to 15:1.

13. The process of claim 11, wherein the coating comprises the $Al_{13}$ Keggin cluster and the hydroxy aluminosilicate compound and wherein the coating is applied by dipping, painting, spraying, electrostatic spraying, spin-coating, or a combination thereof.

* * * * *